(12) United States Patent
Ishii et al.

(10) Patent No.: US 10,094,423 B2
(45) Date of Patent: Oct. 9, 2018

(54) ROLLING BEARING

(71) Applicant: JTEKT CORPORATION, Osaka-shi, Osaka (JP)

(72) Inventors: Yasuhiko Ishii, Kashiwara (JP); Youzou Taniguchi, Toyota (JP); Takashi Iwata, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/408,721

(22) Filed: Jan. 18, 2017

(65) Prior Publication Data

US 2017/0211628 A1    Jul. 27, 2017

(30) Foreign Application Priority Data

Jan. 26, 2016  (JP) ................................ 2016-012594

(51) Int. Cl.

| | |
|---|---|
| *F16C 33/66* | (2006.01) |
| *F16C 33/58* | (2006.01) |
| *F16C 33/78* | (2006.01) |
| *F16C 33/80* | (2006.01) |
| *F16C 19/16* | (2006.01) |

(52) U.S. Cl.
CPC ........ *F16C 33/6614* (2013.01); *F16C 33/583* (2013.01); *F16C 33/585* (2013.01); *F16C 33/6607* (2013.01); *F16C 33/6629* (2013.01); *F16C 33/7823* (2013.01); *F16C 33/7846* (2013.01); *F16C 33/80* (2013.01); *F16C 19/16* (2013.01)

(58) Field of Classification Search
CPC .............. F16C 33/6614; F16C 33/6607; F16C 33/7823; F16C 33/7846
See application file for complete search history.

(56) References Cited

U.S. PATENT DOCUMENTS 3,350,148 A  *  10/1967  Sanguinetti ......... F16C 33/7846
                                                     277/421
3,414,275 A  *  12/1968  Takahashi ........... F16C 33/7846
                                                     277/421

(Continued)

FOREIGN PATENT DOCUMENTS

| | | | | |
|---|---|---|---|---|
| JP | 2004068924 | * | 3/2004 | .............. F16C 33/80 |
| JP | 2010-164122 A | | 7/2010 | |
| JP | 5636819 B2 | * | 12/2014 | .......... F16C 33/7846 |

OTHER PUBLICATIONS

Machine translation of JP 2004-68924.*

Primary Examiner — Thomas R Hannon
(74) Attorney, Agent, or Firm — Oliff PLC

(57) ABSTRACT

An inner ring includes: a pair of shoulder outer peripheral surfaces on first and second axial sides of a raceway surface of the inner ring in contact with balls; seal grooves disposed in first and second axial ends of the inner ring and defining labyrinth clearances with lips; and edges disposed on the first and second axial sides. Each of the edges is configured to cause grease flowing along an associated one of the shoulder outer peripheral surfaces to leave the shoulder outer peripheral surface in the direction of an extension thereof. Each of the lips includes a lip oblique surface functioning as a guide surface to guide the grease that has left the edge not to a radially inner region of the bearing but to a radially outer region of the bearing.

10 Claims, 6 Drawing Sheets

(56) References Cited

U.S. PATENT DOCUMENTS

| | | | | |
|---|---|---|---|---|
| 4,655,617 A | * | 4/1987 | Yasui | F16C 33/7846 |
| | | | | 384/465 |
| RE36,804 E | * | 8/2000 | Kajihara | F16C 33/6603 |
| | | | | 277/402 |
| 8,523,449 B2 | * | 9/2013 | Hamada | F16C 33/3856 |
| | | | | 384/470 |
| 9,500,232 B2 | * | 11/2016 | Ishii | F16C 19/06 |

\* cited by examiner

Related Art

ROLLING BEARING

INCORPORATION BY REFERENCE

The disclosure of Japanese Patent Application No. 2016-012594 filed on Jan. 26, 2016 including the specification, drawings and abstract is incorporated herein by reference in its entirety.

BACKGROUND OF THE INVENTION

1. Field of the Invention

The invention relates to rolling bearings.

2. Description of the Related Art

Rolling bearings known in the related art support rotary shafts of various mechanisms. Rolling bearings require high reliability in performing their functions, This means that rolling bearings preferably do not cause seizure, for example. To prevent seizure, rolling bearings are lubricated with grease having high lubricating performance. Such rolling bearings are increasingly being used in high speed rotation applications. Japanese Patent Application Publication No. 2010-164122 (JP 2010-164122 A), for example, discloses a bearing whose inner portion retains, in advance, grease for lubrication.

FIG. 5 is a cross-sectional view of examples of conventional rolling bearings 90. Referring to FIG. 5, a rotary shaft 99 is oriented longitudinally (or vertically), and a center line C0 of each rolling bearing 90 extends vertically. Each rolling bearing 90 is an angular contact ball hearing and will thus be referred to as an "angular contact ball bearing 90". Each angular contact ball bearing 90 includes an inner ring 91, an outer ring 92, and balls 94 each in contact with the inner ring 91 and the outer ring 92 at a predetermined angle (or contact angle).

The angular contact ball bearings 90 are often used in a pair. A lower angular contact ball bearing 90A and an upper angular contact ball bearing 90B are often attached to a bearing housing 100 etc. so that the contact angle of each ball 94 of the lower angular contact ball bearing 90A and the contact angle of each ball 94 of the upper angular contact ball bearing 90B are oriented in opposite directions. This enables the lower angular contact ball bearing 90A and the upper angular contact ball bearing 90B to support axial loads in both of the directions.

Grease is retained in the inner portion of each angular contact ball bearing 90. Specifically, grease is retained in an annular space 93 defined between the inner ring 91 and the outer ring 92 of each angular contact ball bearing 90. Each angular contact ball bearing 90 is provided with seals 97 and 98 on both axial sides of the annular space 93. To enable high speed rotation, the seals 97 and 98 of each angular contact ball bearing 90 illustrated in FIG. 5 are labyrinth seals (or non-contact seals). The seals 97 and 98 respectively define labyrinth clearances 97a and 98a with the inner ring 91. Thus, the grease retained in the annular space 93 is prevented from leaking to the outside.

Rotation of the inner ring 91 of each angular contact ball bearing 90 causes the grease in the annular space 93 to move in the axial direction under centrifugal force because a pair of shoulders 95 and 96 of the inner ring 91 have different outside diameters. In particular, when each angular contact ball bearing 90 rotates at a high speed, this movement is pronounced. Rotation of the inner ring 91 of the lower angular contact ball bearing 90A in FIG. 5 causes the grease in the annular space 93 to move from a first axial side to a second axial side, i.e., from bottom to top, under centrifugal force. In contrast, rotation of the inner ring 91 of the upper angular contact ball bearing 90B in FIG. 5 causes the grease in the annular space 93 to move from the second axial side to the first axial side, i.e., from top to bottom, under centrifugal force.

When the rotation of the inner ring 91 of the lower angular contact ball bearing 90A is stopped, the centrifugal force mentioned above ceases. This causes the grease in the annular space 93 of the lower angular contact ball bearing 90A to move downward under gravity (or its own weight). The flow of the grease along the outer peripheral surface of the shoulder 96 of the inner ring 91 may result in passage of the grease through the labyrinth clearance 97a and leakage of the grease to the outside. The leakage of the grease may cause lubrication failure and lead to defective conditions, such as, seizure and abnormal wear.

When the rotation of the inner ring 91 of the upper angular contact ball bearing 90B is stopped, the centrifugal force ceases. This causes the grease in the annular space 93 of the upper angular contact ball bearing 90B to move downward under gravity (or its own weight). As indicated by the arrow A in FIG. 6, the grease flows along the outer peripheral surface of the shoulder 95 of the inner ring 91, so that the grease leaves an edge 101 at the end of the shoulder 95 of the inner ring 91 and reaches a lateral surface 98b of a lip 98c of the seal 98. As indicated by the arrow A1 in FIG. 6, a portion of the grease that has reached the lateral surface 98b flows radially outward (i.e., rightward in FIG. 6) and is allowed to remain in the annular space 93. As indicated by the arrow A2 in FIG. 6, the other portion of the grease that has reached the lateral surface 98b may eventually pass through the labyrinth clearance 98a, resulting in leakage of the grease to the outside.

The locations of the angular contact ball bearings 90A and 90B used in a pair may be different from those illustrated in FIG. 5. The locations of the lower angular contact ball bearing 90A and the upper angular contact ball bearing 90B illustrated in FIG. 5 may be reversed. In this case, stopping the rotation of the inner ring 91 of the upper angular contact ball bearing 90A causes the grease in the annular space 93 to flow along the shoulder 96 of the inner ring 91, so that the grease is likely to pass through the labyrinth clearance 97a and leak to the outside.

SUMMARY OF THE INVENTION

An object of the invention is to provide a rolling bearing that would prevent, if the center line of the bearing is vertical, grease in an annular space between an inner ring and an outer ring from passing through a labyrinth clearance between the inner ring and a seal and leaking out of the bearing.

A rolling bearing according to an embodiment of the invention includes an inner ring, an outer ring, a plurality of balls, an annular cage, and seals. The balls are each in contact with a raceway surface of the inner ring and a raceway surface of the outer ring at a contact angle. The cage retains the balls. The seals are attached to portions of the outer ring on first and second axial sides. Each seal includes a lip defining a labyrinth clearance with the inner ring. Each lip is configured to prevent grease leakage. The inner ring includes a pair of shoulder outer peripheral surfaces, seal grooves, and edges. The shoulder outer peripheral surfaces are disposed on the first and second axial sides of the raceway surface of the inner ring in contact with the balls. The seal grooves are disposed in first and second axial ends of the inner ring. Each seal groove defines the labyrinth clearance with an associated one of the lips. The edges are disposed on the first and second axial sides. Each edge is configured to cause grease flowing along an associated one of the shoulder outer peripheral surfaces to leave the shoulder outer peripheral surface in the direction of an extension of the shoulder outer peripheral surface. The lips each include a guide surface to guide the grease that has left the edge not to a radially inner region of the rolling bearing but to a radially outer region of the rolling bearing.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
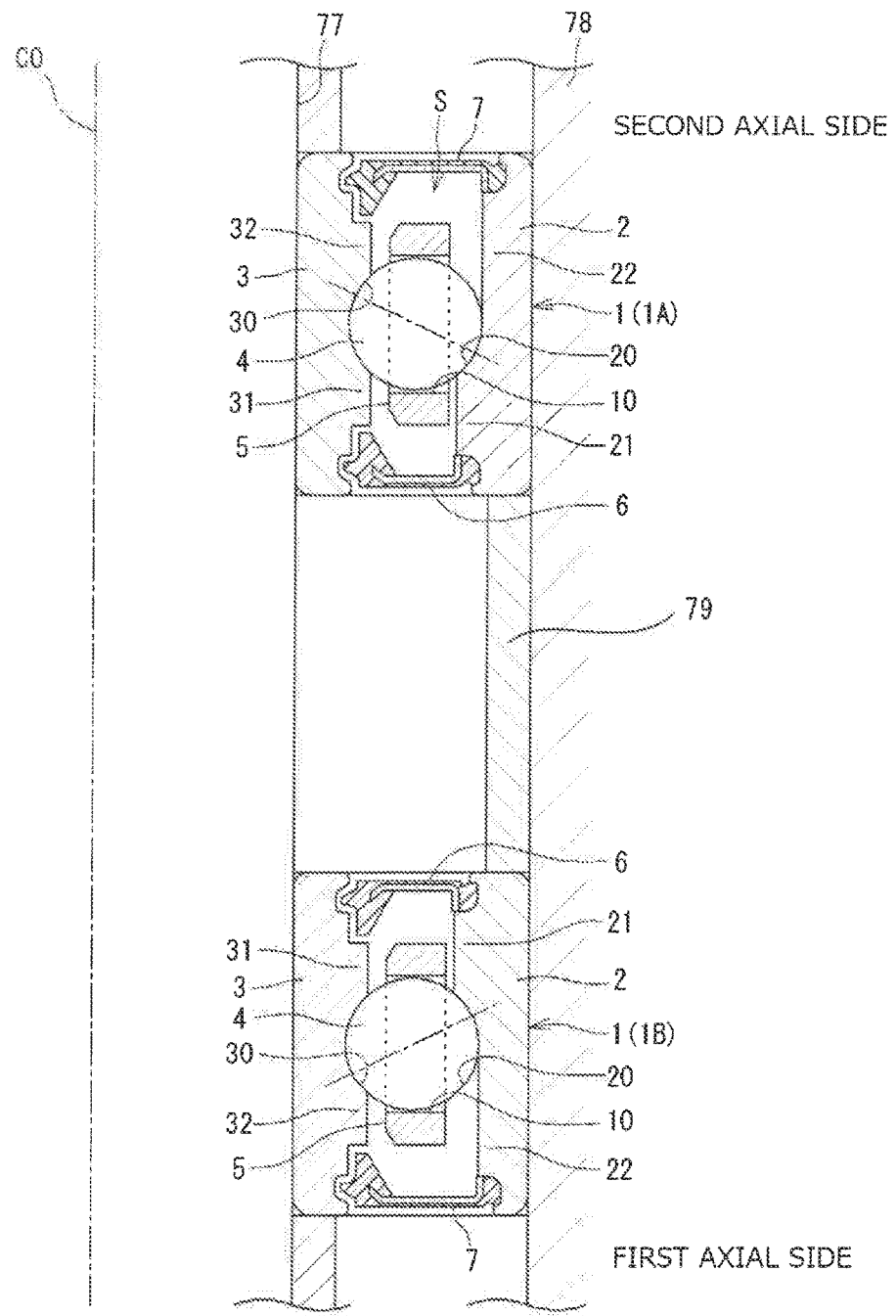
FIG. 1 is a cross-sectional view of rolling bearings according to an embodiment of the invention.

Rolling bearings according to an embodiment of the invention will be described below. FIG. 1 is a cross-sectional view of rolling bearings 1 according to the embodiment of the invention. In this embodiment, a rotary shaft 77 is oriented longitudinally (or vertically). The following description is based on the assumption that the rotary shaft 77 and a center line C0 of each rolling bearing 1 rotatably supporting the rotary shaft 77 extend vertically. The center line C0 of each rolling bearing 1 will hereinafter be referred to as a "bearing center line C0". Each rolling bearing 1 is an angular contact ball bearing. Each rolling bearing 1 includes an inner ring 3, an outer ring 2, and balls 4 each in contact with the inner ring 3 and the outer ring 2 at a predetermined angle (or contact angle). As illustrated in FIG. 1, the rolling bearings (or angular contact ball bearings) 1 are used in a pair. In the following description, the upper one of the pair of rolling bearings 1 may also be referred to as an "upper rolling bearing 1A", and the lower one of the pair of rolling bearings 1 may also be referred to as a "lower rolling bearing 1B". The upper rolling bearing 1A and the lower rolling bearing 1B are attached to a bearing housing 78 so that the contact angle of each ball 4 of the upper rolling bearing 1A and the contact angle of each ball 4 of the lower rolling bearing 1B are oriented in opposite directions. This enables the upper rolling bearing 1A and the lower rolling bearing 1B to support axial loads in both of the directions. A spacer 79 is provided between the upper rolling bearing 1A and the lower rolling bearing 1B.

Although the upper and lower rolling bearings 1A and 1B are identical, the upper and lower rolling bearings 1A and 1B are attached to the rotary shaft 77 such that the upper and lower rolling bearings 1A and 1B are oriented in opposite directions and the contact angle of each ball 4 of the upper rolling bearing 1A and the contact angle of each ball 4 of the lower rolling bearing 1B are oriented in opposite directions. The detailed description of the configuration of the upper rolling bearing 1A below will serve also to describe the configuration of the lower rolling bearing 1B. The elements of the lower rolling bearing 1B identical to those of the upper rolling bearing 1A are wherever possible identified by the same reference characters (or reference numerals).

Figure 2:
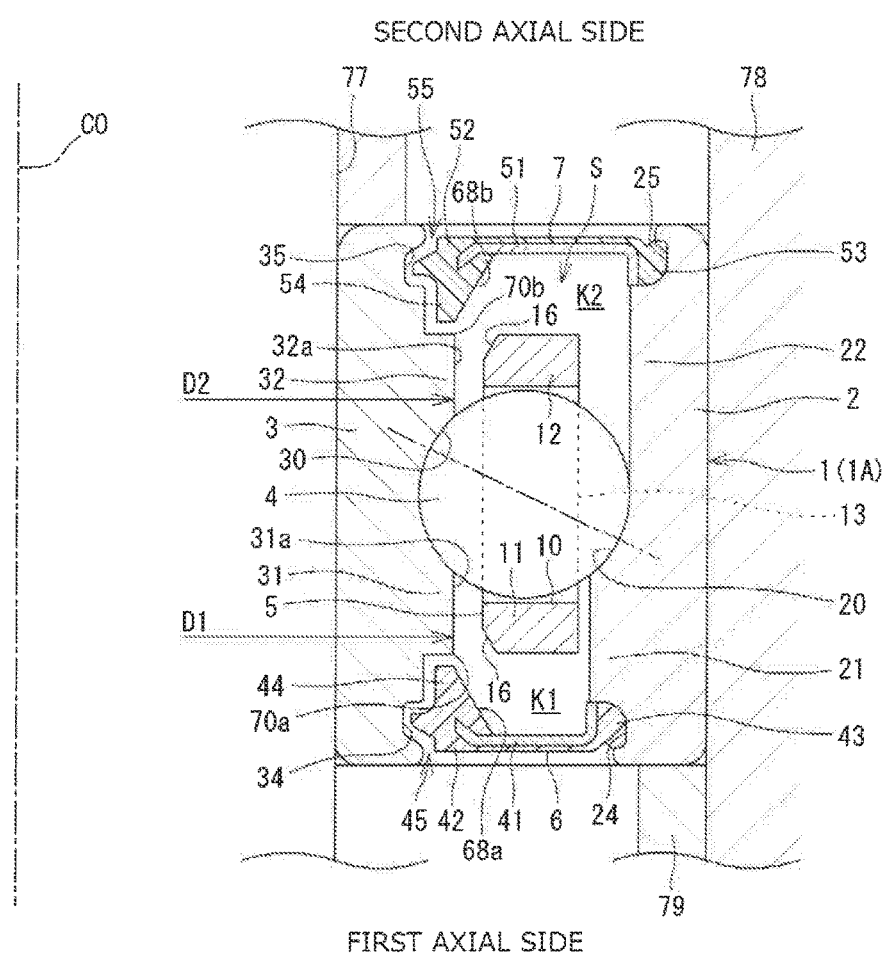
FIG. 2 is a cross-sectional view of the upper one of the rolling bearings.

FIG. 2 is a cross-sectional view of the upper rolling bearing 1A. The rolling bearing 1A includes the outer ring 2, the inner ring 3, the balls (or rolling elements) 4, an annular cage 5, a first seal 6, and a second seal 7. Grease is retained in an annular space S defined between the outer ring 2 and the inner ring 3. The rolling bearing 1A is lubricated with grease so as to provide suitable lubrication for the rolling bearing 1A.

The rolling bearing 1A according to this embodiment is intended for use in high speed rotation applications. In the description of the upper rolling bearing 1A below, the term "first axial side" and the term "second axial side" will be used to respectively indicate one axial side and the other axial side. In this embodiment, the "first axial side" corresponds to the lower side of each drawing, and the "second axial side" corresponds to the upper side of each drawing.

The inner peripheral surface of the outer ring 2 is provided with an outer ring raceway surface 20. Each ball 4 rolls along the outer ring raceway surface 20. The outer ring raceway surface 20 defines a recessed groove. Each ball 4 is in contact with the outer ring raceway surface 20 at a predetermined contact angle. The outer ring 2 includes a first outer shoulder 21 and a second outer shoulder 22 respectively disposed on the first and second axial sides of the outer ring raceway surface 20. The bore diameter (or shoulder diameter) of the second outer shoulder 22 is larger than the bore diameter (or shoulder diameter) of the first outer shoulder 21. An end of the first outer shoulder 21 on the first axial side is provided with a first groove 24. The seal 6 is fixed to the first groove 24. An end of the second outer shoulder 22 on the second axial side is provided with a second groove 25. The seal 7 is fixed to the second groove 25. An entirety of the inner peripheral surface of the outer ring 2 (except portions of the inner peripheral surface where the grooves 24 and 25 are provided) is formed so that the bore diameter of the outer ring 2 gradually increases from the first axial side to the second axial side. The shape of the inner peripheral surface of the outer ring 2 having different shoulder diameters on the first axial side and the second axial side as just described will hereinafter be referred to as an "angular shape".

The outer peripheral surface of the inner ring 3 is provided with an inner ring raceway surface 30. Each ball 4 rolls along the inner ring raceway surface 30. The inner ring raceway surface 30 defines a recessed groove. Each ball 4 is in contact with the inner ring raceway surface 30 at a predetermined contact angle. The inner ring 3 includes a first inner shoulder 31 and a second inner shoulder 32 respectively disposed on the first and second axial sides of the inner ring raceway surface 30. The outside diameter (or shoulder diameter) of the first inner shoulder 31 is equal to the outside diameter (or shoulder diameter) of the second inner shoulder 32. The first inner shoulder 31 includes an outer peripheral surface 31a. The outer peripheral surface 31a of the first inner shoulder 31 may hereinafter be referred to as a "shoulder outer peripheral surface 31a". The second inner shoulder 32 includes an outer peripheral surface 32a. The outer peripheral surface 32a of the second inner shoulder 32 may hereinafter be referred to as a "shoulder outer peripheral surface 32a". The shoulder outer peripheral surface 31a and the shoulder outer peripheral surface 32a each have a cylindrical shape extending along a virtual cylindrical plane, with the bearing center line C0 serving as the center thereof. An end of the first inner shoulder 31 on the first axial side is provided with a first seal groove 34. An end of the second inner shoulder 32 on the second axial side is provided with a second seal groove 35.

Thus, the inner ring 3 is provided with the pair of shoulder outer peripheral surfaces 31a and 32a, and the seal grooves 34 and 35, in addition to the inner ring raceway surface 30 in contact with the balls 4. The shoulder outer peripheral surfaces 31a and 32a are respectively disposed on the first and second axial sides of the inner ring raceway surface 30. The seal grooves 34 and 35 are respectively disposed in the first and second axial ends of the inner ring 3. The seal groove 34 is provided so that a labyrinth clearance 45 is defined between the seal groove 34 and a lip 44 of the seal 6 (which will be described below). The seal groove 35 is provided so that a labyrinth clearance 55 is defined between the seal groove 35 and a lip 54 of the seal 7 (which will be described below).

The balls 4 are provided in the annular space S defined between the outer ring 2 and the inner ring 3. Rotation of the rolling bearing 1A (i.e., rotation of the inner ring 3 in this embodiment) causes the balls 4 to roll along the outer ring raceway surface 20 and the inner ring raceway surface 30, with the balls 4 retained by the cage 5.

The cage 5 retains the balls 4 disposed at predetermined intervals (or equal intervals) in the circumferential direction of the cage 5. For this purpose, the cage 5 is provided with a plurality of circumferentially arranged pockets 10 to contain the balls 4. The cage 5 according to this embodiment includes a first annular portion 11, a second annular portion 12, and a plurality of cage bars 13. The first annular portion 11 is provided on the first axial side of the balls 4. Each cage bar 13 extends from the first annular portion 11 to the second axial side. The second annular portion 12 is provided on the second axial side of the balls 4. Each cage bar 13 connects the first annular portion 11 and the second annular portion 12 to each other. Each pocket 10 is defined between the first annular portion 11 and the second annular portion 12 and between an associated pair of the cage bars 13, 13 circumferentially adjacent to each other. The cage 5 according to this embodiment is made of resin. Alternatively, the cage 5 may be made of metal. The first annular portion 11 of the cage 5 according to this embodiment is in sliding contact with the inner peripheral surface of a portion of the outer ring 2 (or more specifically, the first outer shoulder 21) so as to effect radial positioning of the cage 5. Thus, the cage 5 is guided by the outer ring 2.

The first seal 6 includes an annular core 41, and a seal main body 42 fixed to the core 41. The core 41 is made of metal. The seal main body 42 is made of rubber. The seal main body 42 includes a radially outer end 43 and the lip 44. The lip 44 may hereinafter be referred to as a "first lip 44". The end 43 is fitted to the first groove 24. The lip 44 faces the seal groove 34, with a slight clearance defined therebetween. The end 43 is fitted and secured to the first groove 24, thus attaching the first seal 6 to the outer ring 2. The slight clearance defined between the lip 44 and the seal groove 34 is the first labyrinth clearance 45. In other words, the lip 44 and the seal groove 34 provide a labyrinth seal (or non-contact seal).

The second seal 7 includes an annular core 51, and a seal main body 52 fixed to the core 51. The core 51 is made of metal. The seal main body 52 is made of rubber. The seal main body 52 includes a radially outer end 53 and the lip 54. The lip 54 may hereinafter be referred to as a "second lip 54". The end 53 is fitted to the second groove 25. The lip 54 faces the seal groove 35, with a slight clearance defined therebetween. The end 53 is fitted and secured to the second groove 25, thus attaching the second seal 7 to the outer ring 2. The slight clearance defined between the lip 54 and the seal groove 35 is the second labyrinth clearance 55. In other words, the lip 54 and the seal groove 35 provide a labyrinth seal (or non-contact seal).

Rotation of the inner ring 3 of the rolling bearing 1A (or rotation of the rotary shaft 77) illustrated in FIG. 2 causes the grease in the annular space S to move (or flow) from the first axial side (i.e., the lower side of FIG. 2) to the second axial side (i.e., the upper side of FIG. 2) owing to the angular shape. This action is called a "pumping action". Spinning of the balls 4 also causes the grease to move in this manner. In particular, when the rolling bearing 1A rotates at a high speed, this action is pronounced. The second seal 7, however, prevents leakage of the grease to the outside of the rolling bearing 1A, so that the grease is stored in a space K2 defined between the seal 7 and the balls 4. The space K2 functions to store the grease.

Stopping rotation of the inner ring 3 (or the rotary shaft 77) or low speed rotation of the inner ring 3 (or the rotary shaft 77) causes the grease in the annular space S to move (or flow) from the second axial side (i.e., the upper side of FIG. 2) to the first axial side (i.e., the lower side of FIG. 2) under its own weight (or gravity). The grease in the vicinity of the outer periphery of the inner ring 3, in particular, flows along the first inner shoulder 31. The first seal 6, however, prevents leakage of the grease to the outside of the rolling bearing 1A, so that the grease is stored in a space K1 defined between the seal 6 and the balls 4. The space K1 functions to store the grease. Further description will be given below of how the first seal 6 prevents leakage of the grease to the outside of the rolling bearing 1A.

As previously described, the rolling bearing 1A illustrated in FIG. 2 includes the first seal 6 including the first lip 44, and the second seal 7 including the second lip 54. The first and second seals 6 and 7 are respectively attached to portions of the outer ring 2 on the first and second axial sides. The labyrinth clearance 45 is defined between the first seal 6 and the inner ring 3, and the labyrinth clearance 55 is defined between the second seal 7 and the inner ring 3, thus preventing the grease in the annular space S from flowing out of the rolling bearing 1A. Because the seals 6 and 7 are non-contact seals, the rolling bearing 1A is suitable for high speed rotation applications.

Figure 3:
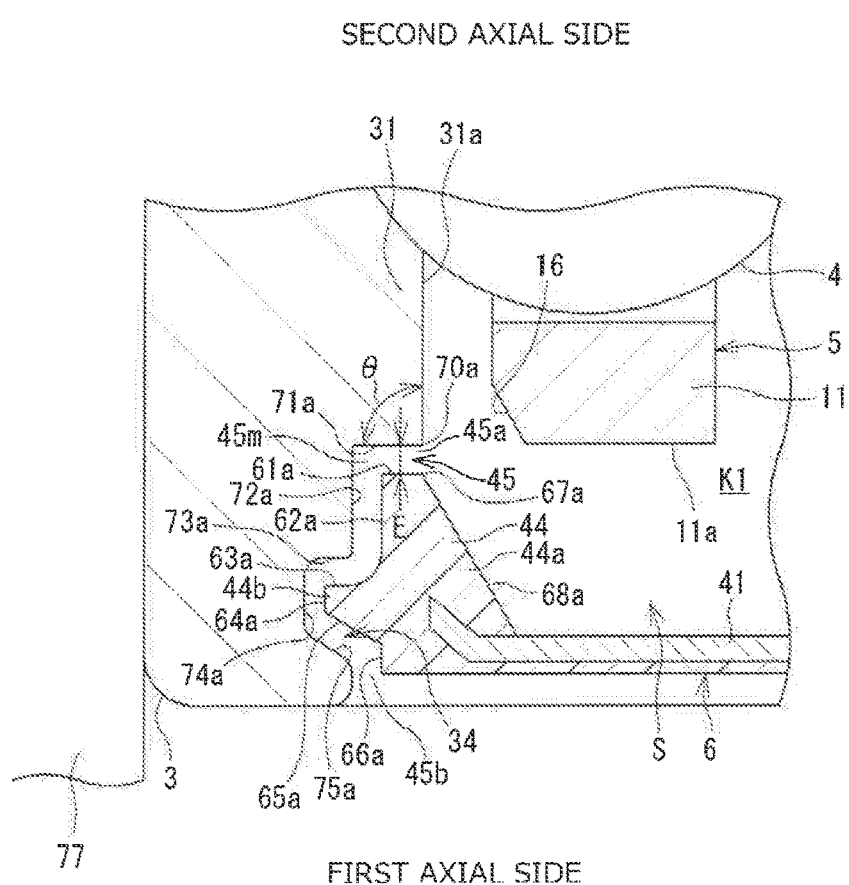
FIG. 3 is an enlarged view of the upper one of the rolling bearings, illustrating a first seal, a first seal groove, and elements adjacent thereto.

FIG. 3 is an enlarged view of the rolling bearing 1A, illustrating the first seal 6, the first seal groove 34, and elements adjacent thereto. The first lip 44 of the first seal 6 includes a main body 44a and a protrusion 44b. A portion of the main body 44a is fixed to the core 41. The protrusion 44b protrudes radially inward from the inner periphery of the main body 44a. The protrusion 44b is disposed inside the seal groove 34.

The lip 44 includes surfaces facing the inner ring 3, i.e., a lip lateral surface 61a, a lip inner cylindrical surface 62a, a lip annular surface 63a, a lip intermediate cylindrical surface 64a, a lip intermediate oblique surface 65a, and a lip outer cylindrical surface 66a in the order of their proximity to the innermost portion of the rolling bearing 1A (i.e., the balls 4). The first seal groove 34 includes an inner annular lateral surface 71a, an inner cylindrical surface 72a, an intermediate annular lateral surface 73a, an intermediate cylindrical surface 74a, and a convex surface 75a in the order of their proximity to the innermost portion of the rolling bearing 1A (i.e., the balls 4). The lip 44 further includes a lip oblique surface 68a. The lip oblique surface 68a is tapered such that the lip 44 increases in diameter as the lip oblique surface 68a extends axially outward from a radially outer end 67a of the lip lateral surface 61a (i.e., the starting point of the lip oblique surface 68a).

The lip lateral surface 61a faces the inner annular lateral surface 71a. The lip inner cylindrical surface 62a faces the inner cylindrical surface 72a. The lip annular surface 63a faces the intermediate annular lateral surface 73a. The lip intermediate cylindrical surface 64a faces the intermediate cylindrical surface 74a. The lip intermediate oblique surface 65a and the lip outer cylindrical surface 66a face the convex surface 75a. The first labyrinth clearance 45 is defined between the surfaces of the first lip 44 and the first seal groove 34 facing each other. A portion of the first labyrinth clearance 45 located between the lip lateral surface 61a and the inner annular lateral surface 71a is an entry 45a to the first labyrinth clearance 45. A portion of the first labyrinth clearance 45 located between the lip outer cylindrical surface. 66a and the convex surface 75a is an exit 45b from the first labyrinth clearance 45.

Figure 4:
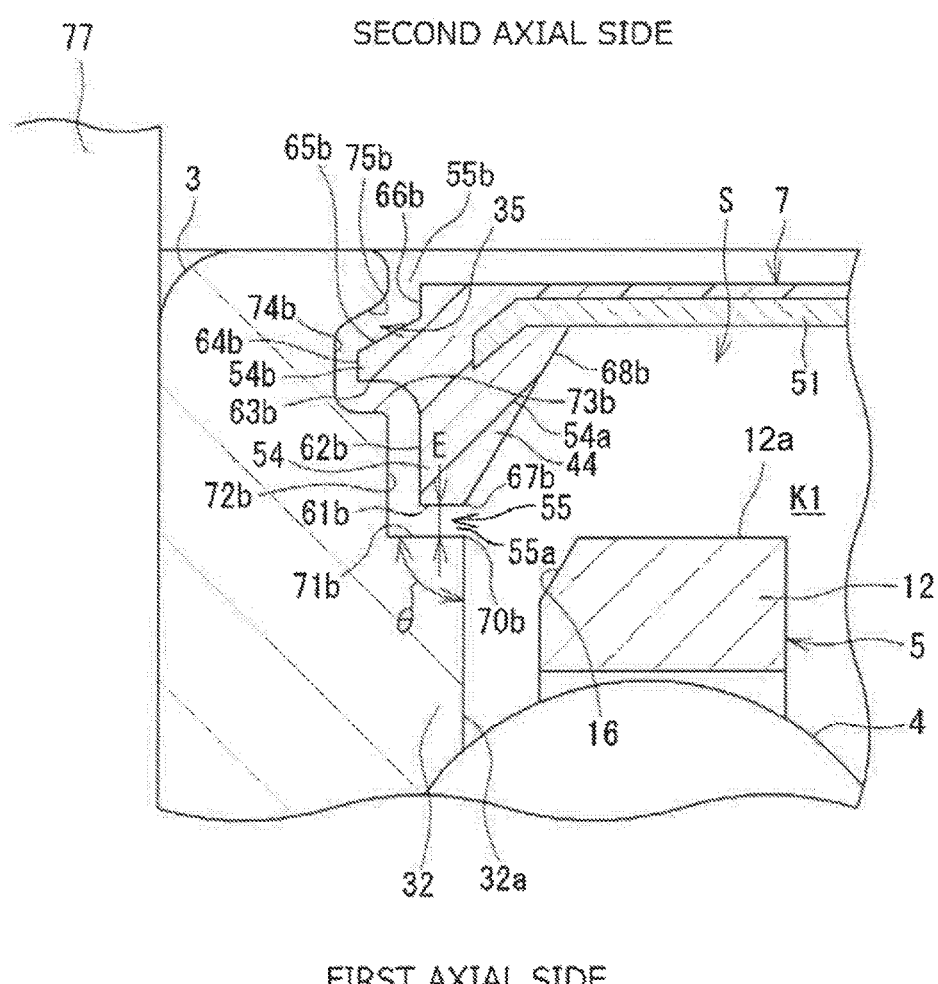
FIG. 4 is an enlarged view of the upper one of the rolling bearings, illustrating a second seal, a second seal groove, and elements adjacent thereto.
Figure 5:
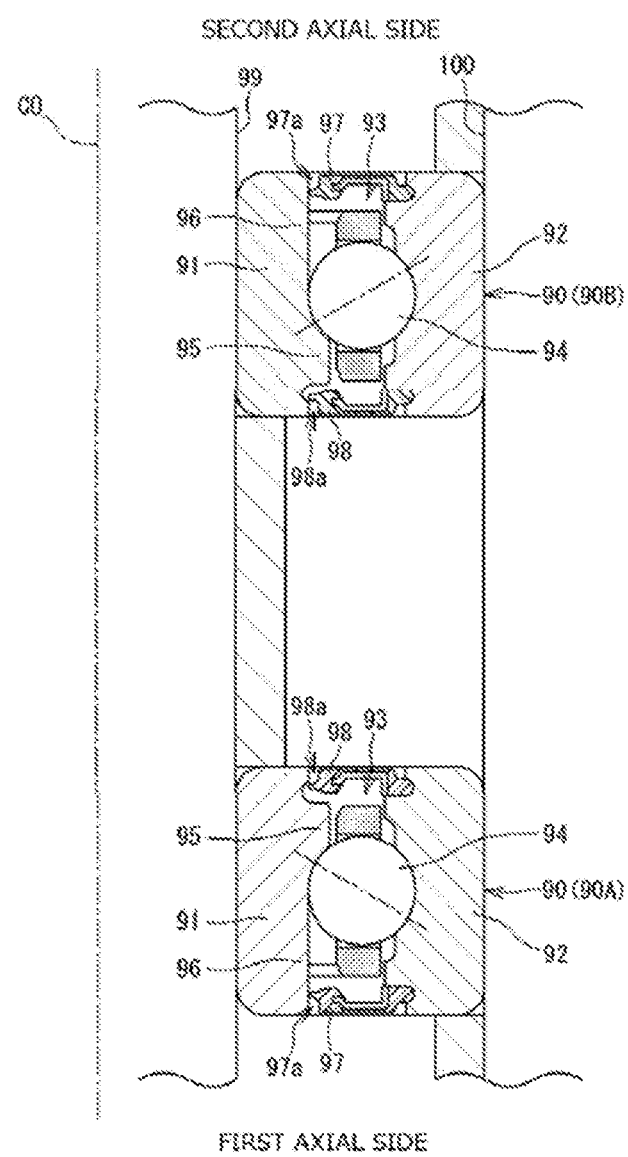
FIG. 5 is a cross-sectional view of examples of conventional rolling bearings.
Figure 6:
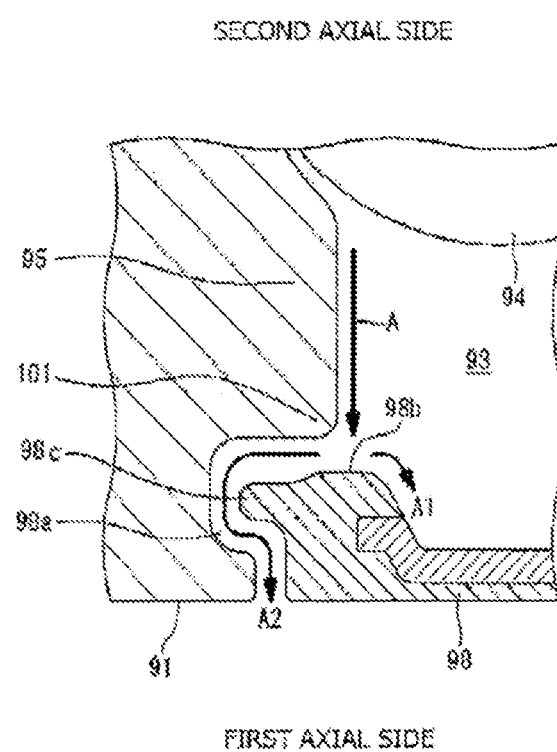
FIG. 6 is a partial cross-sectional view of one of the conventional rolling bearings.

FIG. 4 is an enlarged view of the rolling bearing 1A, illustrating the second seal 7, the second seal groove 35, and elements adjacent thereto. The second lip 54 of the second seal 7 includes a main body 54a and a protrusion 54b. A portion of the main body 54a is fixed to the core 51. The protrusion 54b protrudes radially inward from the inner periphery of the main body 54a. The protrusion 54b is disposed inside the seal groove 35.

The lip 54 includes surfaces facing the inner ring 3, i.e., a lip lateral surface 61b, a lip inner cylindrical surface 62b, a lip annular surface 63b, a lip intermediate cylindrical surface 64b, a lip intermediate oblique surface 65b, and a lip outer cylindrical surface 66b in the order of their proximity to the innermost portion of the rolling bearing 1A (i.e., the balls 4). The second seal groove 35 includes an inner annular lateral surface 71b, an inner cylindrical surface 72b, an intermediate annular lateral surface 73b, an intermediate cylindrical surface 74b, and a convex surface 75b in the order of their proximity to the innermost portion of the rolling bearing 1A (i.e., the balls 4). The lip 54 further includes a lip oblique surface 68b. The lip oblique surface 68b is tapered such that the lip 54 increases in diameter as the lip oblique surface 68b extends axially outward from a radially outer end 67b of the lip lateral surface 61b (i.e., the starting point of the lip oblique surface 68b).

The lip lateral surface 61b faces the inner annular lateral surface 71b. The lip inner cylindrical surface 62b faces the inner cylindrical surface 72b. The lip annular surface 63b faces the intermediate annular lateral surface 73b. The lip intermediate cylindrical surface 64b faces the intermediate cylindrical surface 74b. The lip intermediate oblique surface 65b and the lip outer cylindrical surface 66b face the convex surface 75b. The second labyrinth clearance 55 is defined between the surfaces of the second lip 54 and the second seal groove 35 facing each other. A portion of the second labyrinth clearance 55 located between the lip lateral surface 61b and the inner annular lateral surface 71b is an entry 55a to the second labyrinth clearance 55. A portion of the second labyrinth clearance 55 located between the lip outer cylindrical surface 66b and the convex surface 75b is an exit 55b from the second labyrinth clearance 55.

Each of the lip inner cylindrical surface 62a, the lip intermediate cylindrical surface 64a, and the lip outer cylindrical surface 66a of the lip 44 according to this embodiment, facing the inner ring 3, is a cylindrical surface extending along a virtual cylindrical plane, with the bearing center line C0 (see FIG. 2) serving as the center thereof. Each of the lip inner cylindrical surface 62b, the lip intermediate cylindrical surface 64b, and the lip outer cylindrical surface 66b of the lip 54 according to this embodiment, facing the inner ring 3, is a cylindrical surface extending along a virtual cylindrical plane, with the bearing center line C0 (see FIG. 2) serving as the center thereof. Each of the lip annular surface 63a and the lip lateral surface 61a of the lip 44 is an annular surface extending along a virtual plane perpendicular to the bearing center line C0. Each of the lip annular surface 63b and the lip lateral surface 61b of the lip 54 is an annular surface extending along a virtual plane perpendicular to the bearing center line C0. Each of the inner annular lateral surface 71a and the intermediate annular lateral surface 73a of the seal groove 34 according to this embodiment is an annular surface extending along a virtual plane perpendicular to the bearing center line C0. Each of the inner annular lateral surface 71b and the intermediate annular lateral surface 73b of the seal groove 35 according to this embodiment is an annular surface extending along a virtual plane perpendicular to the bearing center line C0. Each of the inner cylindrical surface 72a and the intermediate cylindrical surface 74a of the seal groove 34 is a cylindrical surface extending along a virtual cylindrical plane, with the bearing center line C0 serving as the center thereof. Each of the inner cylindrical surface 72b and the intermediate cylindrical surface 74b of the seal groove 35 is a cylindrical surface extending along a virtual cylindrical plane, with the bearing center line C0 serving as the center thereof.

As previously described, stopping rotation of the inner ring 3 of the rolling bearing 1A illustrated in FIG. 2 (i.e., stopping rotation of the rotary shaft 77) or low speed rotation of the inner ring 3 (or the rotary shall 77) causes the grease in the annular space S to move (or flow) downward under its own weight (or gravity). The grease in the vicinity of the outer periphery of the inner ring 3 flows along the outer peripheral surface 31a of the first inner shoulder 31. The first seal 6, however, effectively prevents leakage of the grease to the outside of the rolling bearing 1A. The following description discusses how this feature is implemented.

Referring to FIG. 3, as previously mentioned, the outer peripheral surface 31a of the first inner shoulder 31 (i.e., the shoulder outer peripheral surface 31a) has a cylindrical shape extending along a virtual cylindrical plane, with the bearing center line C0 (see FIG. 2) serving as the center thereof. The first seal groove 34 includes the inner annular lateral surface 71a extending along a virtual plane perpendicular to the bearing center line C0. The shoulder outer peripheral surface 31a and the inner annular lateral surface 71a intersect with each other to define an intersection 70a. The intersection 70a serves as an edge to cause the grease flowing along the shoulder outer peripheral surface 31a to leave the shoulder outer peripheral surface 31a in the direction of an extension thereof (i.e., in the downward direction in FIG. 3). Specifically, the grease flowing down along the shoulder outer peripheral surface 31a leaves the intersection (or edge) 70a, flows over the entry 45a to the labyrinth clearance 45, and then drops on the first lip 44. The first lip 44 serving to receive the grease dropped includes the lip oblique surface 68a. The lip oblique surface 68a is tapered such that the first lip 44 increases in diameter as the lip oblique surface 68a extends axially outward from the radially outer end 67a of the lip lateral surface 61a (i.e., the starting point of the lip oblique surface 68a). The edge (or intersection) 70a and the starting point (or end) 67a are aligned in the radial direction (i.e., in the right-left direction in FIG. 3). This means that the starting point (or end) 67a is located on the extension of the shoulder outer peripheral surface 31a.

This arrangement enables the lip oblique surface 68a to guide the grease that has left (or dropped from) the edge (or intersection) 70a to the space K1. The space K1 does not serve to store the grease in the radially inner region of the rolling bearing 1A (i.e., the left region in FIG. 3) but serves to store the grease in the radially outer region of the roiling bearing 1A (i.e., the right region in FIG. 3). In other words, the lip oblique surface 68a functions as a guide surface to guide the grease that has left (or dropped from) the edge (or intersection) 70a not to the radially inner region but to the radially outer region. Thus, the grease that has flowed along the shoulder outer peripheral surface 31a and over the entry 45a to the labyrinth clearance 45 then flows along the lip oblique surface 68a. The grease that has flowed along the lip oblique surface 68a is retained in the space K1 and used for lubrication of the rolling bearing 1A.

In this embodiment, the angle θ of intersection of the shoulder outer peripheral surface 31a and the inner annular lateral surface 71a at the intersection (or edge) 70a, in particular, is 90 degrees. This makes it likely that the grease that has flowed along the shoulder outer peripheral surface 31a will leave the intersection (or edge) 70a in the direction of the extension of the shoulder outer peripheral surface 31a, flow into the entry 45a, and flow onto the lip oblique surface 68a. In one example, the inner annular lateral. surface 71a may be inclined such that the angle θ of intersection is 90 degrees or less. In this case also, functions similar to those just mentioned are achievable. In contrast, when the angle θ of intersection is an obtuse angle greater than 90 degrees, the grease is likely to flow along the shoulder outer peripheral surface 31a and then along the inner annular lateral surface 71a. In such a case, the grease is more likely to flow through the labyrinth clearance 45.

As previously mentioned, the rolling bearing 1A according to this embodiment is used, with the bearing center line C0 oriented vertically. The inner ring 3 includes the intersection (or edge) 70a to cause the grease that has flowed along the shoulder outer peripheral surface 31a to leave the shoulder outer peripheral surface 31a in the direction of the extension thereof. The lip 44 includes the lip oblique surface 68a functioning as the guide surface to guide the grease that has left the intersection (or edge) 70a not to the radially inner region but to the radially outer region, the space K1. This arrangement prevents the grease retained in the inner portion of the rolling bearing 1A from passing through the labyrinth clearance 45 under its own weight and leaking out of the rolling bearing 1A.

The above embodiment has been described on the assumption that the starting point of the lip oblique surface 68a (or the radially outer end 67a of the lip lateral surface 61a) is located on the extension of the shoulder outer peripheral surface 31a in a cross section including the bearing center line C0. The starting point (or end) 67a may alternatively be located radially inward of the extension of the shoulder outer peripheral surface 31a. In this case also, the lip oblique surface 68a guides the grease that has left the edge (or intersection) 70a of the inner ring 3 not to the radially inner region but to the radially outer region. Consequently, the grease retained in the inner portion of the rolling bearing 1A is prevented from passing through the labyrinth clearance 45 under its own weight and leaking out of the rolling bearing 1A.

As previously described, high speed rotation of the inner ring 3 of the rolling bearing 1A or high speed rotation of the rotary shaft 77 (see FIG. 2), in particular, produces a pumping action that causes the grease in the annular space S to move (or flow) to the second axial side owing to the angular shape. If this action causes the grease in the vicinity of the outer periphery of the inner ring 3 to flow along the second inner shoulder 32, the second seal 7 would effectively prevent the grease from leaking out of the rolling bearing 1A. This feature will be described in more detail below.

As illustrated in FIG. 2, the combined structure of the second seal groove 35 and the second lip 54 of the second seal 7 (i.e., the upper one of the seals) and the combined structure of the first seal groove 34 and the first lip 44 of the first seal 6 (i.e., the lower one of the seals) are the same or substantially the same and symmetrical with respect to a horizontal center line. The shoulder outer peripheral surface 32a and the inner annular lateral surface 71b intersect with each other to define an intersection 70b. The intersection 70b serves as an edge to cause the grease flowing along the shoulder outer peripheral surface 32a to leave the shoulder outer peripheral surface 32a in the direction of an extension thereof (i.e., in the upward direction in FIG. 4). This, as already mentioned, enables the first seal 6 (i.e., the lower one of the seals) to prevent leakage of the grease moving under its own weight (see FIG. 3). Similarly, the second seal 7 (i.e., the upper one of the seals) prevents leakage of the grease moving under the pumping action (see FIG. 4).

In this embodiment, as illustrated in FIG. 2, the shoulder outer peripheral surface 31a on the first axial side has an outside diameter D1, and the shoulder outer peripheral surface 32a on the second axial side has an outside diameter D2. The outside diameter D1 and the outside diameter D2 are equal to each other. This makes it unlikely that the grease will move axially owing to a difference in outside diameter between the shoulder outer peripheral surfaces 31a and 32a of the inner ring 3. In other words, the grease is unlikely to flow axially along the outer peripheral surface of the inner ring 3, making it difficult for the grease to pass through the labyrinth clearance 55 and leak to the outside.

Referring to FIG. 2, the combined structure of the second lip 54 and the second seal groove 35 and the combined structure of the first lip 44 and the first seal groove 34 are the same or substantially the same and symmetrical with respect to the horizontal center line. If, although not illustrated, the rolling bearing 1A is flipped vertically, this arrangement would enable the second seal 7 (i.e., the lower one of the seals in this case) to prevent leakage of the grease moving under its own weight. This arrangement also prevents leakage of the grease moving under the pumping action. In other words, this arrangement will prevent grease leakage irrespective of whether the first axial side is the lower side or the upper side of the rolling bearing 1A or regardless of in which direction the contact angle is oriented. When the upper rolling bearing 1A illustrated in FIG. 2 is flipped vertically, the rolling bearing 1A flipped has the same or substantially the same structure as the lower rolling hearing 1B illustrated in FIG. 1.

As illustrated in FIG. 3, the portion of the labyrinth clearance 45 between the inner annular lateral surface 71a of the first seal groove 34 and the lip lateral surface 61a of the first lip 44 serves as the entry to the labyrinth clearance 45. The inner annular lateral surface 71a and the lip lateral surface 61a have an axial spacing E therebetween. The spacing E is defined such that the axial length of a radially outer opening (i.e., the entry 45a) is equal to the axial length of a region 45m radially inward of the opening (i.e., the entry 45a). This means that the labyrinth clearance 45 does not increase in size at the opening (i.e., the entry 45a), making it difficult for the grease to flow into the labyrinth clearance 45. In other words, this feature enhances the effect of preventing grease leakage. Alternatively, the axial spacing E between the inner annular lateral surface 71a and the lip lateral surface 61a may be defined such that the axial length of the opening (i.e., the entry 45a) is smaller than the axial length of the radially inward region 45m. In this case also, the labyrinth clearance 45 does not increase in size at the opening (or the entry 45a). This enhances the effect of preventing grease leakage. The combined structure of the second lip 54 and the second seal groove 35 and the combined structure of the first lip 44 and the first seal groove 34 have the same or substantially the same shape and are symmetrical with respect to the horizontal center line. Thus, similarly to the labyrinth clearance 45 between the first lip 44 and the first seal groove 34, the labyrinth clearance 55 between the second lip 54 and the second seal groove 35 (see FIG. 4) does not increase in size at the opening (i.e., the entry 55a). Consequently, the effect of preventing grease leakage is enhanced.

As illustrated in FIG. 3, the entry 45a to the labyrinth clearance 45 is provided between the inner annular lateral surface 71a and the lip lateral surface 61a axially facing each other. The entry 45a is in communication with the annular space S radially outward of the entry 45a. Thus, the grease flowing from the second axial side to the first axial side through the annular space S and flowing along the shoulder outer peripheral surface 31a is unlikely to enter the labyrinth clearance 45. Similarly to the entry 45a, the entry 55a to the labyrinth clearance 55 between the second lip 54 and the second seal groove 35 (see FIG. 4) is in communication with the annular space S radially outward of the entry 55a.

The annular portion 11 of the cage 5 includes a surface 11a on the first axial side. The surface 11a is located closer to the second axial side relative to the entry 45a to the labyrinth clearance 45 (or located above the entry 45a in FIG. 3). Thus, the annular portion 11 does not radially overlap with the entry 45a. In other words, the entry 45a is not closed by the annular portion 11. Accordingly, when rotation of the rolling bearing 1A causes the grease in the entry 45a to flow radially outward under centrifugal force, the radially outward flow of the grease is facilitated. This consequently makes it difficult for the grease in the entry 45a to pass through the labyrinth clearance 45 and leak out of the rolling bearing 1A. The annular portion 12 of the cage 5 includes a surface 12a on the second axial side. The surface 12a is located closer to the second axial side relative to the entry 55a to the labyrinth clearance 55 (or located above the entry 55a in FIG. 4). Thus, the annular portion 12 does not radially overlap with the entry 55a. In other words, the entry 55a is not closed by the annular portion 12. Accordingly, when rotation of the rolling bearing 1A causes the grease in the entry 55a to flow radially outward under centrifugal force, the radially outward flow of the grease is facilitated. This consequently makes it difficult for the grease in the entry 55a to pass through the labyrinth clearance 55 and leak out of the rolling bearing 1A.

As illustrated in FIG. 2, the cage 5 includes the annular portions 11 and 12 respectively disposed on the first and second axial sides of the balls 4. The inner peripheral surfaces of the annular portions 11 and 12 each include a tapered surface 16. Each tapered surface 16 inclines radially outward as it extends axially outward. The tapered surfaces 16 enable a space between the annular portion 11 and the first inner shoulder 31 and a space between the annular portion 12 and the second inner shoulder 32 to increase in size axially outward. The tapered surfaces 16 enable the grease flowing axially outward to be guided radially outward.

In this embodiment, the first lip 44, in particular, includes the lip lateral surface 61a and the lip oblique surface 68a as already mentioned (see FIG. 3). The lip lateral surface 61a faces the inner annular lateral surface 71a of the first seal groove 34, with the clearance defined therebetween. The radially outer end 67a of the lip lateral surface 61a is the starting point of the lip oblique surface 68a. Because the first lip 44 includes the lip oblique surface 68a, the clearance between the first lip 44 and the annular portion 11 of the cage 5 decreases in size, making it likely that the grease will remain in the vicinity of the entry 45a to the first labyrinth clearance 45. The inner peripheral surface of the annular portion 11, however, includes the tapered surface 16 as previously mentioned, so as to prevent the grease from remaining in the vicinity of the entry 45a. This consequently makes it difficult for the grease to enter the first labyrinth clearance 45. Although a portion of the inner peripheral surface of the annular portion 11 defines the tapered surface 16 in the embodiment illustrated in FIG. 3, an entirety of the inner peripheral surface of the annular portion 11 may be the tapered surface 16.

Not only the first lip 44 but also the second lip 54 (see FIG. 4) axially opposite thereto achieves the functions described above.

The rolling bearing 1A (or 1B) configured as described above would prevent, if the bearing center line C0 is vertical, the grease in the annular space S between the inner ring 3 and outer ring 2 from passing through the labyrinth clearance 45 between the seal 6 and the inner ring 3 and the labyrinth clearance 55 between the seal 7 and the inner ring 3 and leaking out of the rolling bearing 1A (or 1B). This consequently keeps lubrication insufficiency from occurring, thus preventing occurrence of defective conditions, such as seizure and abnormal wear, for a long period of time.

The embodiment disclosed above is illustrative and not restrictive in all respects. In other words, the rolling bearing according to the invention is not limited to the embodiment illustrated. The embodiment illustrated may be changed or modified without departing from the scope of the invention. In one example, the first lip 44 and the second lip 54 may have difference sizes, although the above embodiment has been described on the assumption that the first lip 44 and the second lip 54 have identical sizes. The rolling bearing according to the invention may be used not only for high speed rotation applications but also for general-purpose applications.

The rolling bearing according to the invention would prevent, if the bearing center line is vertical, the grease in the annular space between the inner ring and the outer ring from passing through the labyrinth clearances between the inner ring and the seals and leaking out of the rolling bearing, thus keeping lubrication insufficiency from occurring.

What is claimed is:
1. A rolling bearing comprising:
   an inner ring;
   an outer ring;
   a plurality of balls each in contact with a raceway surface of the inner ring and a raceway surface of the outer ring at a contact angle;
   an annular cage retaining the balls; and seals attached to portions of the outer ring on first and second axial sides, each seal including a lip defining a labyrinth clearance with the inner ring, each lip being configured to prevent grease leakage,
wherein:
the inner ring includes
a pair of shoulder outer peripheral surfaces on the first and second axial sides of the raceway surface of the inner ring in contact with the balls,
seal grooves in first and second axial ends of the inner ring, each seal groove defining the labyrinth clearance with an associated one of the lips, and
edges on the first and second axial sides, each edge being configured to cause grease flowing along an associated one of the shoulder outer peripheral surfaces to leave the shoulder outer peripheral surface in the direction of an extension of the shoulder outer peripheral surface,
the lips each include a guide surface to guide the grease that has left the edge not to a radially inner region of the rolling bearing but to a radially outer region of the rolling bearing, and
an inner peripheral surface of the cage does not extend in an axial direction past the opening of the labyrinth clearance, the opening of the labyrinth clearance being formed between the edge of each outer peripheral surface and the guide surface of each lip.

2. The rolling bearing according to claim 1, wherein the shoulder outer peripheral surfaces on the first and second axial sides have equal outside diameters.

3. The rolling bearing according to claim 1, wherein the shoulder outer peripheral surfaces on the first and second axial sides each have a cylindrical shape extending along a virtual cylindrical plane, with a center line of the bearing serving as a center of the virtual cylindrical plane,
the seal grooves on the first and second axial sides each include an annular lateral surface extending along a virtual plane intersecting with the bearing center line, and
the edges each include an intersection of an associated one of the shoulder outer peripheral surfaces and an associated one of the annular lateral surfaces, the associated one of the shoulder outer peripheral surfaces and the associated one of the annular lateral surfaces intersecting with each other at an intersection angle of 90 degrees or less.

4. The rolling bearing according to claim 3, wherein the shoulder outer peripheral surfaces on the first and second axial sides have equal outside diameters.

5. The rolling bearing according to claim 1, wherein the shoulder outer peripheral surfaces on the first and second axial sides each have a cylindrical shape extending along a virtual cylindrical plane, with a center line of the bearing serving as a center of the virtual cylindrical plane,
the seal grooves on the first and second axial sides each include an annular lateral surface extending along a virtual plane intersecting with the bearing center line,
the lips on the first and second axial sides each include
an annular lip lateral surface facing the annular lateral surface of an associated one of the seal grooves, and
a lip oblique surface that increases in diameter as the lip oblique surface extends axially outward from a radially outer end of the lip lateral surface, the radially outer end serving as a starting point of the lip oblique surface, the lip oblique surface functioning as the guide surface, and
the starting point on each of the first and second axial sides in a cross section including the bearing center line is located on the extension of an associated one of the shoulder outer peripheral surfaces or radially inward of the extension of an associated one of the shoulder outer peripheral surfaces.

6. The rolling bearing according to claim 5, wherein the shoulder outer peripheral surfaces on the first and second axial sides have equal outside diameters.

7. The rolling bearing according to claim 5, wherein the edges each include an intersection of an associated one of the shoulder outer peripheral surfaces and an associated one of the annular lateral surfaces, the associated one of the shoulder outer peripheral surfaces and the associated one of the annular lateral surfaces intersecting with each other at an intersection angle of 90 degrees or less.

8. The rolling bearing according to claim 7, wherein the shoulder outer peripheral surfaces on the first and second axial sides have equal outside diameters.

9. The rolling bearing according to claim 5, wherein each of the annular lateral surfaces and an associated one of the lip lateral surfaces have an axial spacing therebetween, the spacing being defined such that an axial length of a radially outer opening is equal to an axial length of a region radially inward of the opening or such that the axial length of the opening is shorter than the axial length of the radially inward region.

10. The rolling bearing according to claim 9, wherein the shoulder outer peripheral surfaces on the first and second axial sides have equal outside diameters.

* * * * *